(12) United States Patent
Katase

(10) Patent No.: US 7,190,849 B2
(45) Date of Patent: Mar. 13, 2007

(54) DISPLAY DEVICE

(75) Inventor: Makoto Katase, Suwa (JP)

(73) Assignee: Seiko Epson Corporation (JP)

( * ) Notice: Subject to any disclaimer, the term of this patent is extended or adjusted under 35 U.S.C. 154(b) by 145 days.

(21) Appl. No.: 11/049,221

(22) Filed: Feb. 2, 2005

(65) Prior Publication Data

US 2005/0169600 A1    Aug. 4, 2005

(30) Foreign Application Priority Data

Feb. 3, 2004    (JP)    ............... 2004-027345

(51) Int. Cl.
  *G02F 1/035*    (2006.01)
  *G09G 5/36*    (2006.01)

(52) U.S. Cl. .............. 385/2; 385/17; 385/40; 385/901; 362/559; 345/90; 345/94

(58) Field of Classification Search .......... 385/2, 385/17, 40, 129, 901, 147; 362/551–582; 345/55–111
See application file for complete search history.

(56) References Cited

U.S. PATENT DOCUMENTS

| | | | |
|---|---|---|---|
| 6,819,393 B1* | 11/2004 | Date et al. ................. | 349/201 |
| 6,862,382 B2* | 3/2005 | Wang et al. ................. | 385/31 |
| 6,956,332 B2* | 10/2005 | Van Gorkom et al. ... | 315/169.1 |
| 7,024,094 B2* | 4/2006 | Kimura ...................... | 385/147 |
| 2002/0187697 A1* | 12/2002 | Kiryuschev et al. ........ | 442/181 |
| 2003/0147233 A1* | 8/2003 | Sugiura et al. .............. | 362/31 |
| 2005/0105284 A1* | 5/2005 | Ishizuka ..................... | 362/84 |
| 2005/0191020 A1* | 9/2005 | Katase ........................ | 385/129 |
| 2006/0066939 A1* | 3/2006 | Kimura ....................... | 359/321 |

FOREIGN PATENT DOCUMENTS

| | | |
|---|---|---|
| JP | 59-148030 | 8/1984 |
| JP | 01-185692 | 7/1989 |

* cited by examiner

*Primary Examiner*—John D. Lee
*Assistant Examiner*—Rhonda S. Peace
(74) *Attorney, Agent, or Firm*—Harness, Dickey & Pierce, P.L.C.

(57) ABSTRACT

A display device is provided having a light-emitter for emitting light depending upon predetermined display data, and a display panel having a plurality of elongated optical waveguides for conducting light entering from the light-emitter, and an addresser for extracting light from a predetermined region within the optical waveguide depending upon the predetermined display data. The addresser has column electrodes separately provided respectively for the plurality of optical waveguides and a plurality of elongated row electrodes provided to cross the column electrodes at an opposite side through the optical waveguides. Light is emitted at the predetermined region by applying a voltage to a crossing point of the column electrodes and the row electrodes.

14 Claims, 18 Drawing Sheets

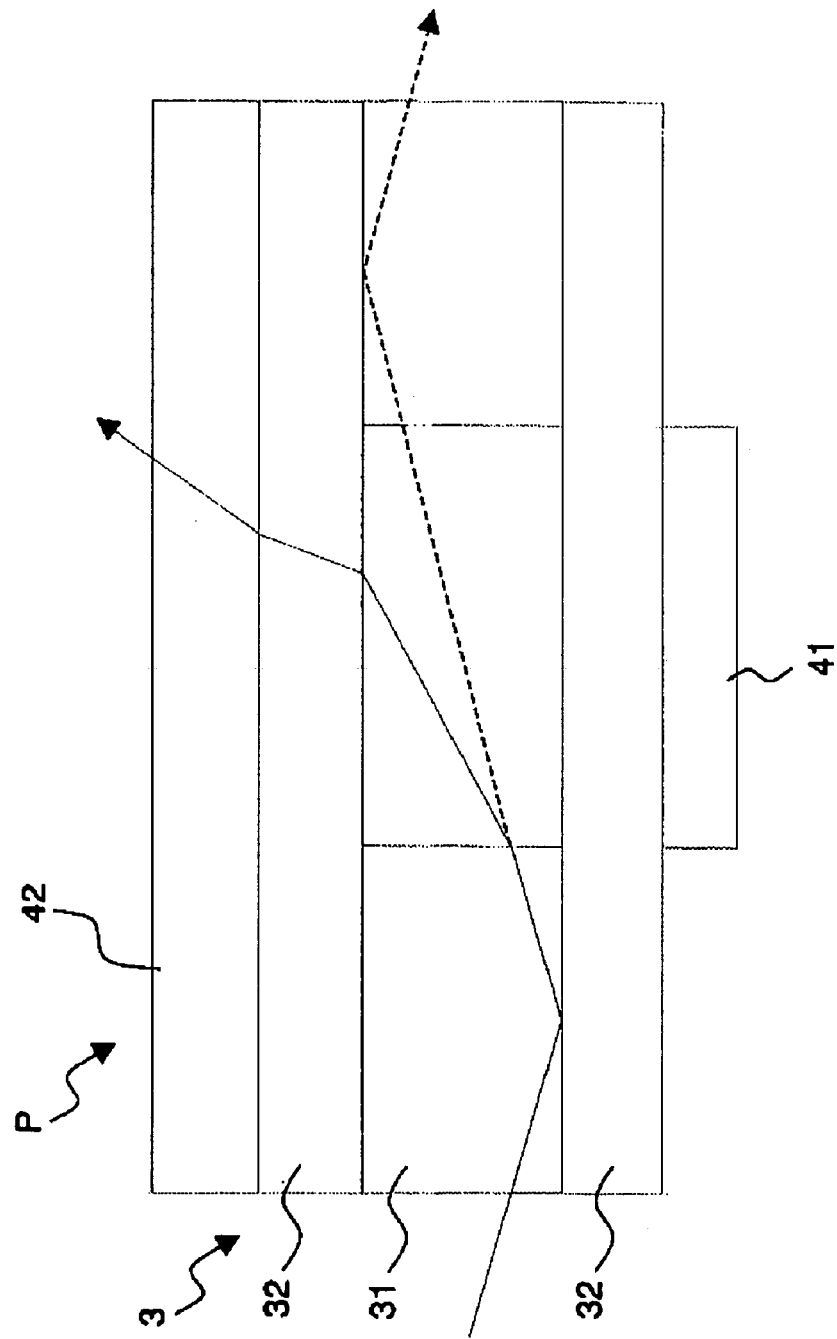

F I G. 8
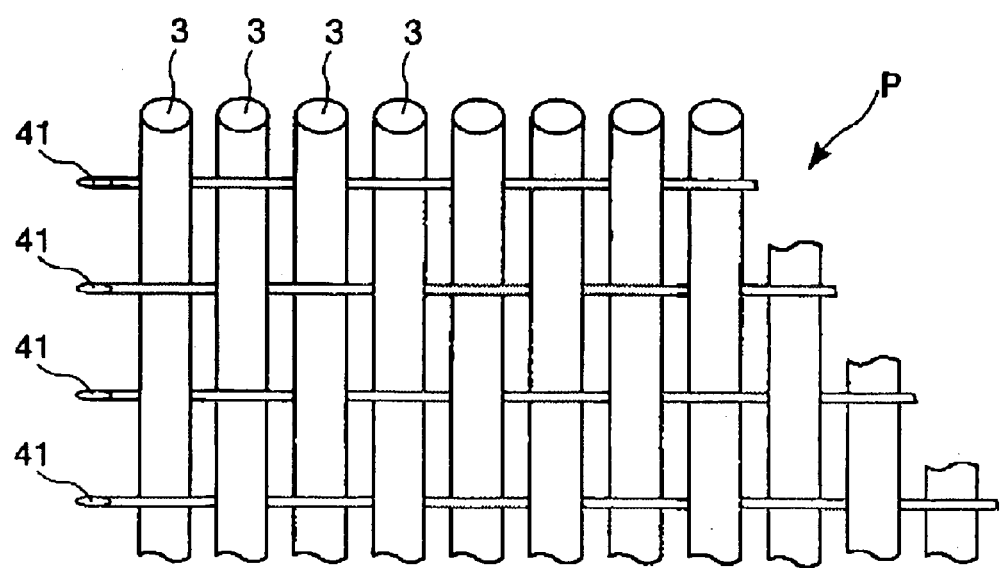

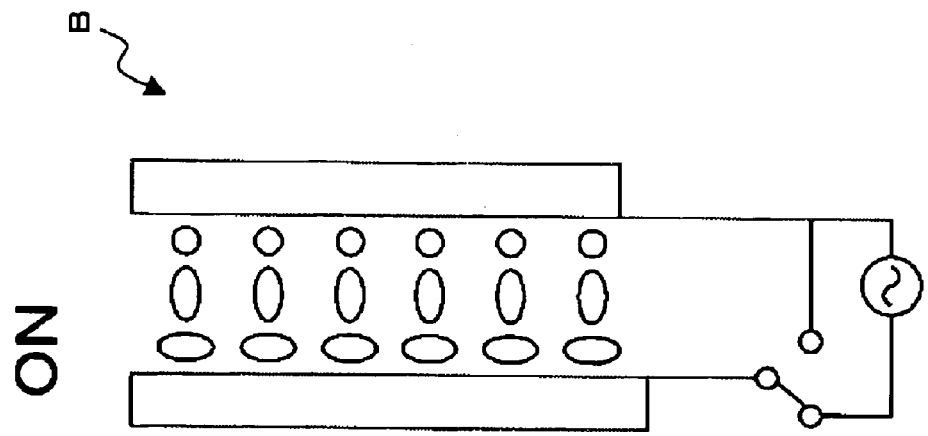
FIG. 13A OFF
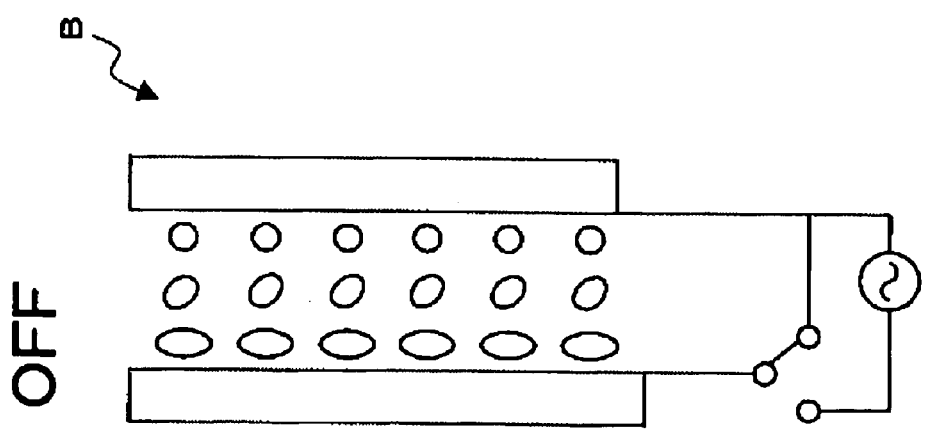
FIG. 13B ON

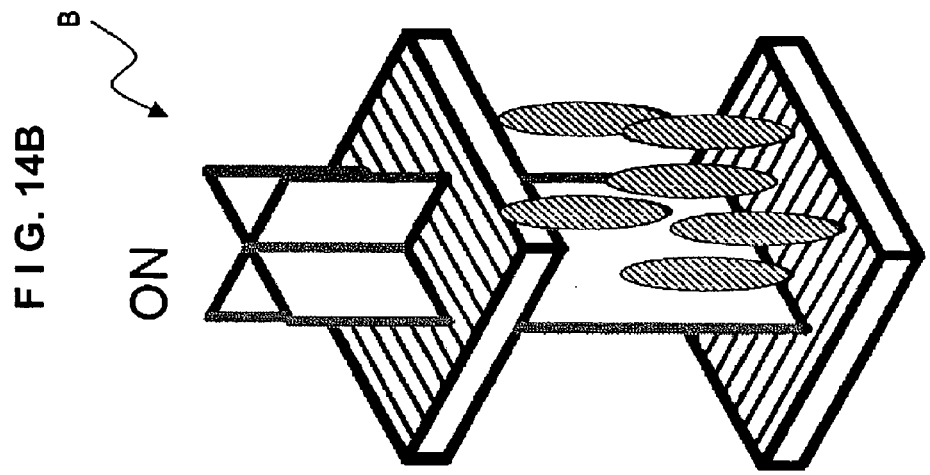
FIG. 14B ON
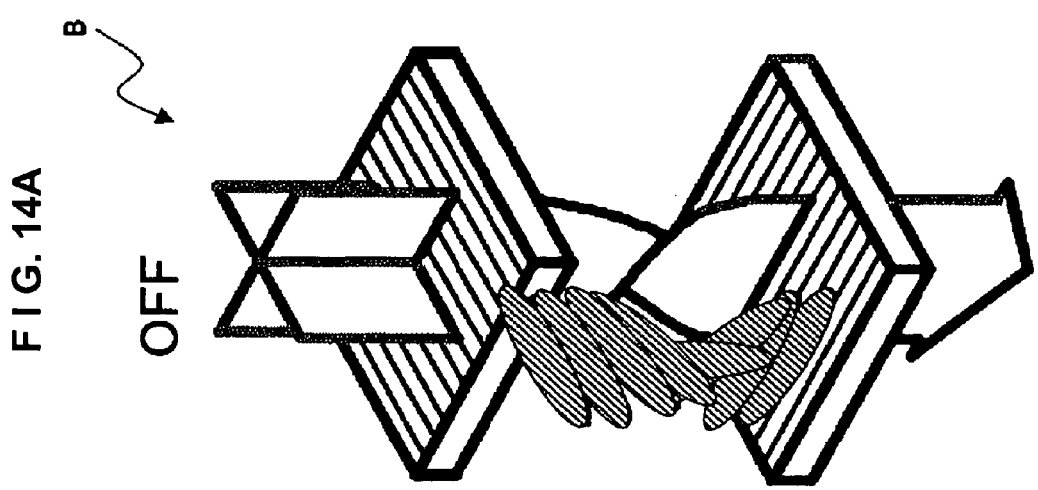
FIG. 14A OFF

DISPLAY DEVICE

RELATED APPLICATIONS

This application claims priority to Japanese Patent Application No. 2004-027345 filed Feb. 3, 2004 which is hereby expressly incorporated by reference herein in its entirety.

BACKGROUND

1. Technical Field

The present invention relates to display devices.

2. Related Art

The conventional display device has a refractive-index changing unit on the outer surface of the optical waveguide (optical fiber). The refractive-index changing unit sandwiches the optical waveguide so that it can apply an electric field to the optical waveguide while driving the display device. Thereupon, the optical waveguide at a region where the electric field is applied is changed in its refractive index by the Kerr effect, thus causing the light propagating in the interior to emit to the outside. This causes light emission on the light-emitting panel (see JP-A-59-148030, for example).

Meanwhile, there is a disclosure of a structure having a core in a supper-lattice structure made by alternately forming two kinds of thin films, e.g. of amorphous silicon (a-Si) and silicon nitride (a-Si), and a clad made by two transparent electrodes sandwiching the same. The refractive index of the core is changed by applying a voltage to the transparent electrodes, based on which the light propagating in the core can be emitted to the outside (see JP-A-1-185692, for example).

Here, in the display device described in JP-A-59-148030, the refractive-index changing unit is made by a coat film of nitroglycerin and formed over nearly the entire surface of the display region. However, because this structure has a single-structured refractive-index changing unit, for a display device having a plurality of optical waveguides there is difficulty in driving those at each of the optical waveguides. Meanwhile, the display device described in JP-A-1-185692 involves a problem in that the manufacturing cost is high because time and labor is required in forming a core supper-lattice structure. Consequently, such optical-waveguide type display devices, despite being old in technical history, have never been put into practical application or onto the market.

The present invention provides a display device having a plurality of optical waveguide units and is capable of driving those at each of the optical waveguide units.

SUMMARY

The above object can be achieved by the following.

A display device of the invention comprises: a light-emitting unit for emitting light depending upon predetermined display data; and a display panel having a plurality of elongated optical waveguide units for conducting light entering from the light-emitting unit, and an addressing unit for extracting light from a predetermined region within the optical waveguide units depending upon the predetermined display data; the addressing unit having column electrodes separately provided respectively for the plurality of optical waveguide units and a plurality of elongated row electrodes provided to cross the column electrodes at an opposite side through the optical waveguide units; whereby light is emitted at the predetermined region by applying a voltage to a crossing point of the column electrodes and the row electrodes.

This makes it possible to carry out addressing to the optical waveguide units on a column-by-column basis.

In the display device of the invention, the column electrodes are preferably provided within the optical waveguide units.

This makes it easy to manufacture the column elements comprising the optical waveguide units and row electrodes.

In the display device of the invention, each of the optical waveguide units preferably has a core layer for propagating light and a cladding layer covering an outer shell of the core layer, a column electrode being provided within the core layer.

This can reduce the light transfer loss within the optical waveguide units.

In the display device of the invention, an internal cladding layer is preferably formed on a peripheral surface of the column electrodes.

This can further reduce the light transfer loss within the optical waveguide units.

In the display device of the invention, each of the optical waveguide units preferably has a core layer for propagating light and a cladding layer covering an outer shell of the core layer, the core layer being structured of a material having a changeable refractive-index, the addressing unit being structured to cause light to emit from an interior of the optical waveguide units due to a change in the refractive index of the material.

This can provide optical waveguide units that are capable of emitting light easily and efficiently.

In the display device of the invention, each of the optical waveguide units preferably has a core layer for propagating light and a cladding layer covering an outer shell of the core layer, the core layer being structured of a light scattering liquid crystal, the addressing unit being structured to cause light to emit from an interior of the optical waveguide units due to a light scattering action of the light scattering liquid crystal.

This can provide optical waveguide units that are capable of emitting light easily and efficiently.

In the display device of the invention, the addressing unit is preferably driven by multiplex driving.

This can efficiently drive the display device.

In the display device of the invention, the optical waveguide units and the row electrodes of the addressing unit are preferably respectively substantially arranged in straight-lines and structured substantially orthogonal to one another.

This can easily structure a display region.

In the display device of the invention, the optical waveguide units and the row electrodes of the addressing unit are preferably arranged in a textile form.

This provides a benefit in that it can make use of the existing high-level infrastructure in the textile technical field when manufacturing display panels.

In the display device of the invention, a surface of the display panel may be coated with a transparent material.

This can improve display qualities (contrast, brightness uniformity, viewability, etc.) of the display device by reducing the interface of the display panel and suppressing light scattering.

In the display device of the invention, a back layer for absorbing light is preferably provided on a backside of the display panel.

This can improve display qualities (contrast, brightness uniformity, viewability, etc.) of the display device by reducing the reflection of light (light scatter) upon the display panel.

In the display device of the invention, a back layer is provided on a backside of the display panel, the back layer being structured to selectively take a state to transmit light externally entering the display panel and an absorbing state.

This can provide a plurality of functions to the display device through switching over the characteristic of the back layer, hence enabling applications in compliance with a diversity of use situations by way of a single display device.

In the display device of the invention, the light-emitting unit is preferably structured to allow red light, green light and blue light to enter the optical waveguide units.

This enables color display.

In the display device of the invention, a fluorescent layer having a fluorescent material is preferably provided at least on an area of the display panel where the light is to be extracted.

This can make a color display with further efficiency.

BRIEF DESCRIPTION OF THE DRAWINGS

FIG. 4 is an explanatory figure showing the function of the display device depicted in FIG. 1.

FIG. 8 is a view showing a modification to the display device depicted in FIG. 7.

FIGS. 13A and B are explanatory figures showing drive control to a back layer.

FIGS. 14A and B are explanatory figures showing drive control to the back layer.

DETAILED DESCRIPTION

Now a display device of the present invention will be explained in detail based on described embodiments illustrated in the attached drawings.

First Embodiment

Figure 1:
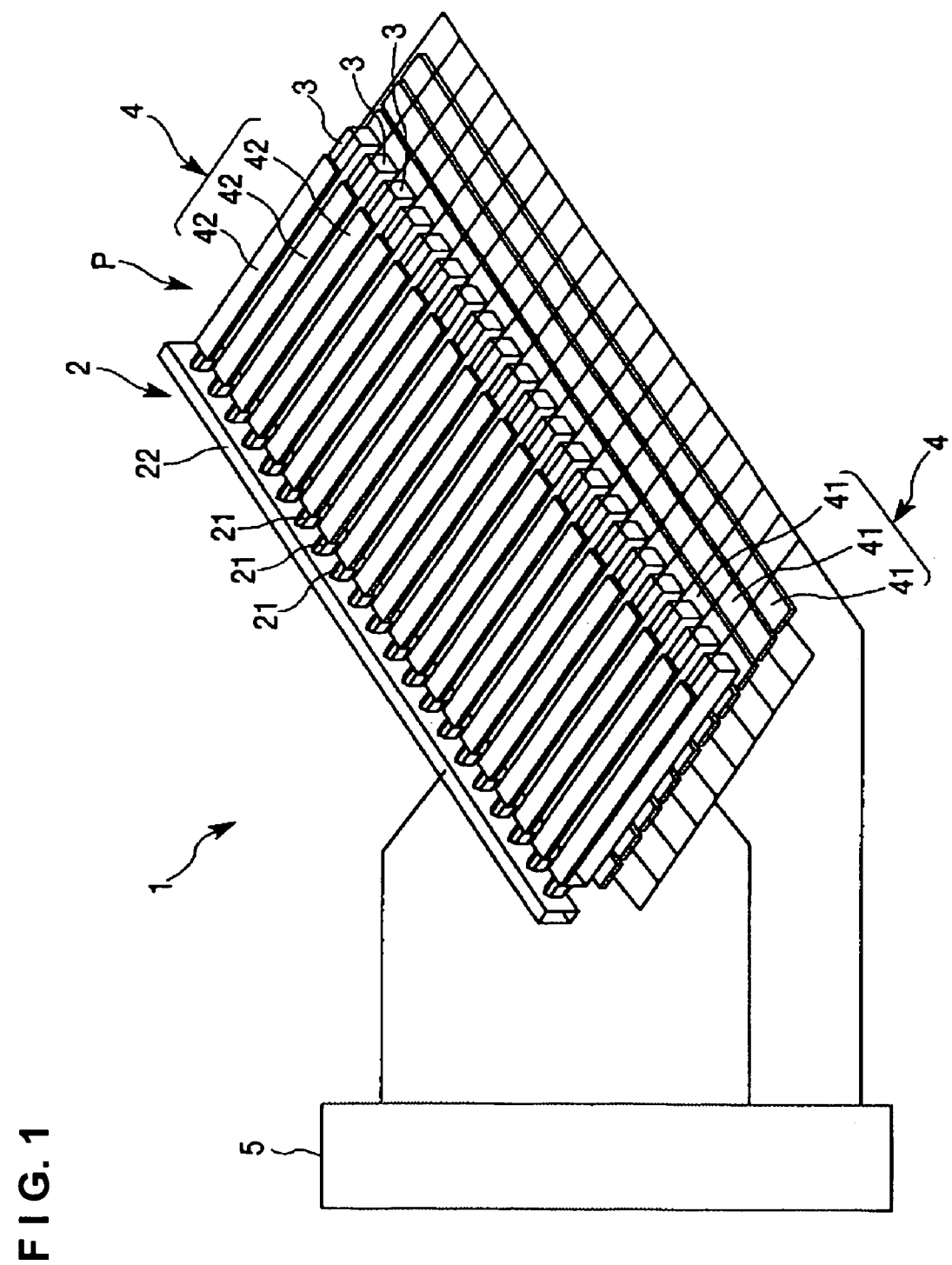
FIG. 1 is a perspective view showing a first embodiment of a display device of the present invention.
Figure 2A:
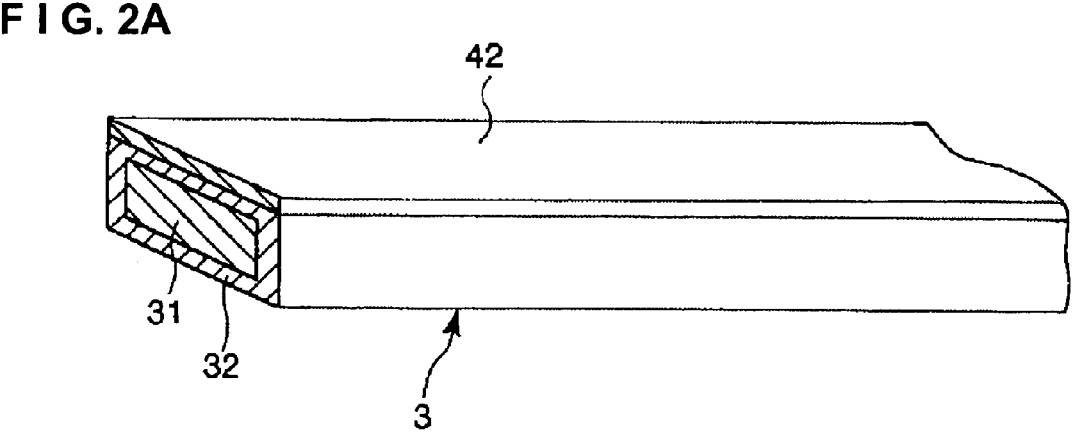
FIGS. 2A and B are views showing a column element of a display panel depicted in FIG. 1.
Figure 2B:
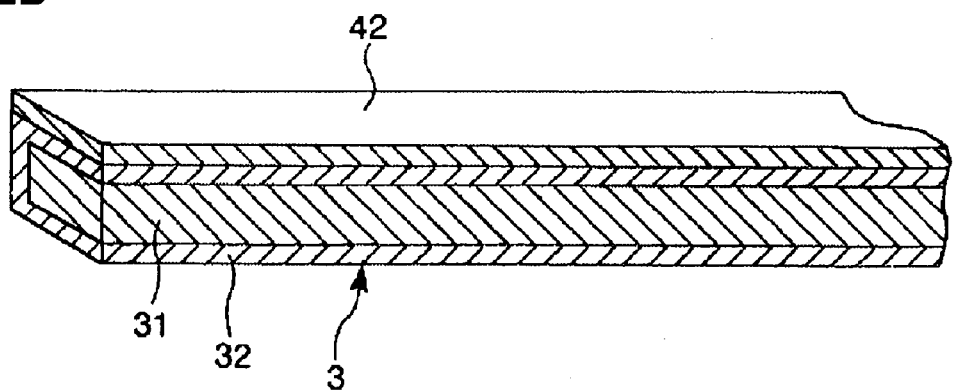

FIG. 1 is a perspective view showing a first embodiment of a display device in the present invention while FIG. 2 is a figure showing a column element of the display panel depicted in FIG. 1. In the same figure, (a) shows a perspective view of the column element while (b) a sectional view of the column element. The display device 1 is a flat display for application to such an appliance as a personal digital assistant, a game machine, a cellular phone, a personal computer or a television set.

Display Device Structure

The display device 1 has a light-emitting unit 2, elongated optical waveguide units 3, an addressing unit 4 and a control unit 5. The display device 1 has a plurality of optical waveguide units 3 and driving electrodes 42 respectively for those of optical waveguide units 3, thereby characterized in that they can be driven at each optical waveguide unit 3.

The light emitting unit 2 has a plurality of light-emitting elements 21. The light-emitting elements 21 are arranged in row on a frame member 22, thus being provided correspondingly to a plurality of optical waveguide units 3 described later (see FIG. 1). Meanwhile, for these light-emitting elements 21, employed are LEDs (light-emitting diodes) or organic EL (organic electro luminescence). The light-emitting unit 2 is connected to control unit 5 so that its driving is controlled by the control unit 5. The light-emitting unit 2 causes the light-emitting elements 21 to emit light depending upon a light-emission signal according to predetermined display data. Thus, the light is caused to enter the corresponding ones of optical waveguide units 3.

Here, display data is image data to be displayed on the display device 1, which may be binary data or intensity-level data. In the case of intensity-level data, light intensity is regulated on the light-emitting elements 21 correspondingly. For a certain device, it may be based on frame intensity levels wherein the light amount is controlled by superimposing screens on a frame-unit basis, or on pulse intensity levels based on regulating the light-emission time in a selective period. Meanwhile, a select signal is a signal to select which pixel is to be put on (turned on) among the pixels of the display device 1, which is to be scanned by a scanning signal inputted to the addressing unit 4. This extracts light, as an image signal, out of the optical waveguide units 3, to turn on the pixels and drive the display device 1. Incidentally, driving the display device 1 is described later.

Each optical waveguide unit 3 is an optical waveguide for conducting the light entering from the light-emitting unit 2, which constitutes a column element of the display panel P. Each optical waveguide unit 3 is formed by a fiber-like member having a generally quadrangular prism form, for example, of a quartz glass or resin material. Meanwhile, each optical waveguide unit 3 has flexibility to be bent or rolled up. The optical waveguide units 3 comprise a core layer 31 for conducting light, and a cladding layer 32 having a refractive index lower than that of the core layer 31 and formed in a shell outboard of the core layer 31 (see FIG. 2). The optical waveguide units 3 are structured, as one set, by a plurality of ones corresponding to the number of light-emitting elements 21 and arranged regularly in a planar fashion over the entire surface of the display region (see FIG. 1). Meanwhile, the optical waveguide units 3 are arranged such that one end of each is positioned close to the corresponding light-emitting element 21. The optical waveguide units 3 have a function to conduct the light entering to the inside from the light-emitting unit 2 (corresponding light-emitting elements 21) and propagate the light from one end thereof to the other end. Incidentally, the light entering the optical waveguide units 3 usually travels while totally reflecting within the optical waveguide units 3, and hence not leaking to the outside at an intermediate location of the optical waveguide units 3.

The addressing unit 4 is structured with row electrodes 41 and column electrodes 42, to discharge the light (image signal) from a predetermined location within the optical waveguide units 3 to the outside by the action described later.

Each row electrode 41 is formed of an electrically conductive material, such as metal or carbon, to have a nearly-plated fiber form. Meanwhile, each row electrode 41 has flexibility to be bent and rolled up. Meanwhile, the row electrodes 41 in plurality are arranged regularly in a planar fashion over the entire surface of the display device 1 in a manner longitudinally crossing (here, intersecting at right angles) with the optical waveguide units 3, thus constituting row elements for the display panel P (see FIG. 1). Meanwhile, the row electrodes 41 are connected to the control unit 5, to be applied (inputted) a voltage as a scanning signal by the control unit 5, thus being drivingly controlled.

Meanwhile, the column electrodes 42 are formed of a transparent, electrically conductive material and arranged, one by one, integrally on the surfaces of the optical waveguide units 3 (see FIGS. 1 and 2). Each column electrode 42 has flexibility to be bent and rolled up. The column electrodes 42 cooperate with the optical waveguide units 3 to constitute column elements of the display panel P. The column electrodes 42 are connected to the control unit 5, and grounded at the control unit 5.

The row electrodes 41 and the column electrodes 42 are provided opposite to each other through the optical waveguide units 3. In case a voltage is applied to between the row electrodes 41 and the column electrodes 42 according to predetermined display data, the light within the optical waveguide units 3 is caused to leak out (emit) at the intersections of the row electrodes 41 and the column electrodes 42 due to the action described later. Thus, light as an image signal is extracted.

The control unit 5 is configured including an IC chip and other drive circuits and connected to the light-emitting unit 2 and to the addressing unit 4. The control unit 5 inputs, to the light-emitting unit 2, a light-emitting signal according to predetermined display data, and, to the addressing unit 4, a scanning signal according to a predetermined drive scheme hereinafter described, thereby drivingly controlling them.

Display Device Functioning

Figure 3:
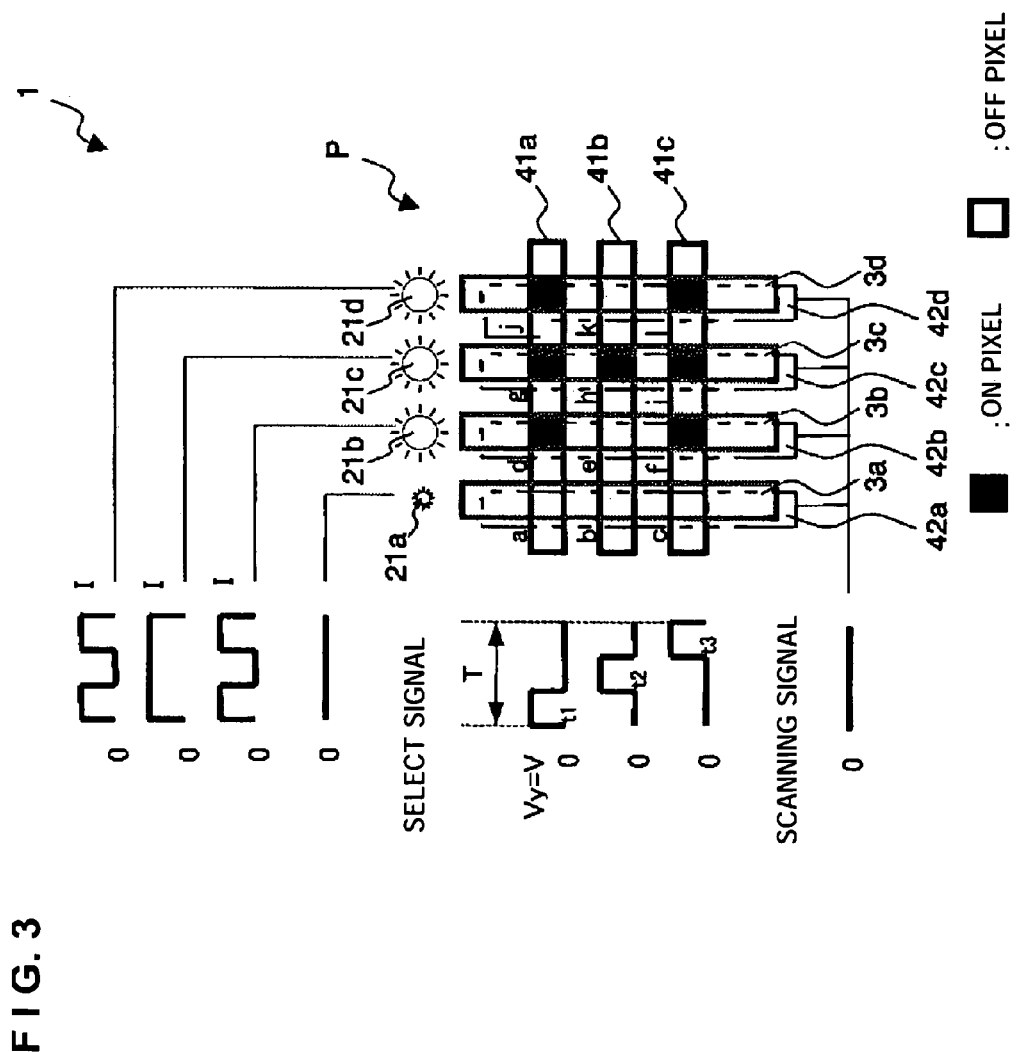
FIG. 3 is an explanatory figure showing the function of the display device depicted in FIG. 1.

FIGS. 3 and 4 are explanatory figures showing the functioning of the display device depicted in FIG. 1. Explanation is made here, as one example, on a display device 1 having 4 columns of required column elements (optical waveguide units 3a–3d and column electrodes 42a–42d) and 3 rows of row-sided elements (row electrodes 41a–41c). Namely, this display device 1 has a display region having 12 pixels (a–l) formed by a matrix having 4 columns×3 rows. Meanwhile, in this example, the display device 1 is given, as display data, an image in a state where the pixels d, g, j, h, f, I, l are being turned on while the remaining pixels a, b, e, k, c are not turned on. Incidentally, the pixels of the display device 1 are constituted by the intersections of the row electrodes 41 and the column electrodes 42, on the optical waveguide units 3. The number of intersections of those electrodes 41, 42 provides the number of pixels on the display device 1.

Meanwhile, the display device 1 employs a drive scheme of multiplex driving (time division driving). Specifically, because the matrix has three scanning rows, one period T is divided into first to third scanning periods t1–t3 (see FIG. 3). Thus, scanning is effected based on line-at-a-time driving. In the first scanning period t1, the pixels a, d, g, j are scanned. In the second scanning period t2, the pixels b, e, h, k are scanned. In the third scanning period t3, the pixels c, f, i, l are scanned.

In this display device 1, at first a reference potential (here, 0 (V)) is provided to the column electrodes 42 of the addressing unit 4. When a light-emitting signal based on predetermined display data is inputted to the light-emitting unit 2, the light-emitting element 21 is turned on/off depending upon the light-emitting signal, the light of which enters the optical waveguide units 3 and travels within the optical waveguide units 3 while totally reflecting. At this time, when a scanning signal is inputted from the control unit 5 to the row electrode 41a in the first scanning period t1, the pixels d, g, j are selected and turned on. Likewise, in the second scanning period t2, the pixel h is selected and turned on while in the third scanning period t3, the pixels f, i, l are selected and turned on. Due to this, one cycle is completed to display an image on the display panel P constituted by 4 columns×3 rows (see FIG. 3).

Here, the pixels a–l of the display device 1, specifically are turned on by the following operation. At first, during driving of the display device 1, the light as a light-emitting signal travels while totally reflecting within the optical waveguide units 3. In this state, the light does not leak outside of the optical waveguide units 3, and hence the pixels a–l are held in a not-lit state. Next, when a scanning signal is inputted (voltage is applied) to the row electrodes 41 of the addressing unit 4, an electric field takes place within the optical waveguide units 3 at the intersection (pixel a–l) of the row electrodes 41 and the column electrodes 42. The electric field has an electric-field intensity in a parallel or radial form having a center of the intersection of the respective row electrode 41 and column electrode 42. Within the optical waveguide units 3, when an electric field is applied, the refractive index changes in the cladding layer 32 by the Kerr effect so that the light traveling therein transmits the cladding layer 32 and leaks to the outside (see FIG. 4). Due to this, the light as an image signal is extracted onto the display panel P, to thereby turn on the pixels a–l. Thus, an image is displayed on the display panel P.

Display Divide Effect

In the display device 1, the column electrodes 42 of the addressing unit 4 are independently provided on the respective ones of optical waveguide units 3, i.e. on a column-by-column basis. This enables addressing to the optical waveguide units 3 on a column-by-column basis. As a result, detection points mutually adjacent are isolated by a space, crosstalk (transfer of light-emitting signals to other pixels) can be advantageously suppressed to improve resolution and sensitivity. Because unitization (optical waveguide, column electrode) is completed on a column unit basis, manufacture can be advantageously made in a continuous fashion, followed by arrangement through cutting to a constant length.

Meanwhile, in this display device 1, because the optical waveguide units 3 and addressing unit 4 (piezoelectric fiber) constituting the display panel P are both formed of a fiber-like member having flexibility, the display panel P is given a structure to be rolled up and bent. Namely, the display device 1 has a structure to be made small by rolling during accommodation and to be spread by extending upon use, thus being to function as a so-called roll-up display. Particularly, such a construction has been difficult to realize because of high technical hurdles caused by the requirement of active elements in. conventional liquid-crystal displays, organic EL displays, electrophoretic displays, etc. In this respect, the present display device 1 has a pioneering structure.

Meanwhile, the display device 1 is structured simple in the panel P as compared to the conventional display device as described in JP-A-59-148030. Hence, it is advantageously easy (1) to connect between the row electrodes 41 and the control unit 5 and (2) to form a core layer 31 for the optical waveguide units 3. Accordingly, product manufacture cost can be advantageously suppressed and mass production can be facilitated as compared to the conventional display device.

Meanwhile, according to the display device 1, for the optical waveguide units 3 having a fiber form, there is provided an addressing technique to extract internal light as an image signal therefrom. Such an addressing technique is not conventionally known and hence novel. Due to this, the display panel P comprising a fiber-formed optical waveguide units 3 can be advantageously placed into practical application though impossible by conventional techniques.

Incidentally, the display device 1 employs line-at-a-time drive as a drive scheme, as noted before. Because this relaxes the requirement for the CR time constant on a line for applying voltage, the frequency can be lowered. However, this is not limitative, i.e. dot sequential drive as represented in the CRT (cathode ray tube) may be adopted as a drive scheme in accordance with application.

Meanwhile, in the display device 1, the light-emitting unit 2 may be structured having light-emitting elements 21 respectively for three colors of red light, green light and blue light, for example, so that those lights can be introduced into the optical waveguide units 3. This advantageously enables color (full-color) display on the liquid-crystal panel P.

Figure 5A:
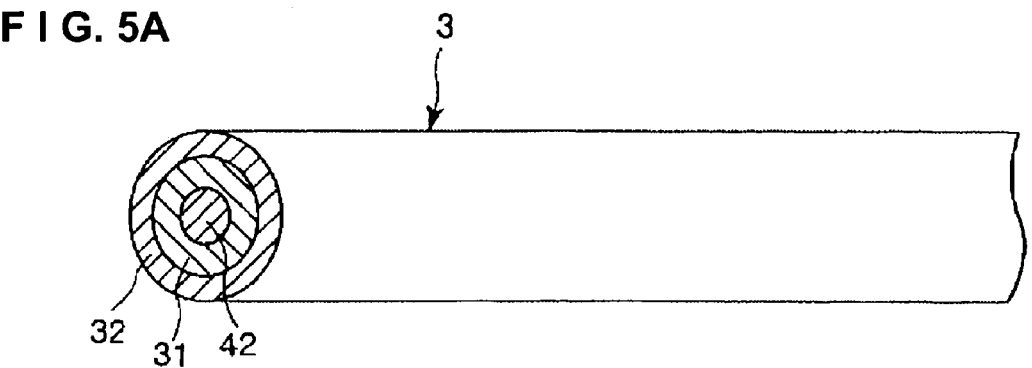
FIGS. 5A and B are views showing a modification as to the column element of the display device depicted in FIG. 2.
Figure 5B:
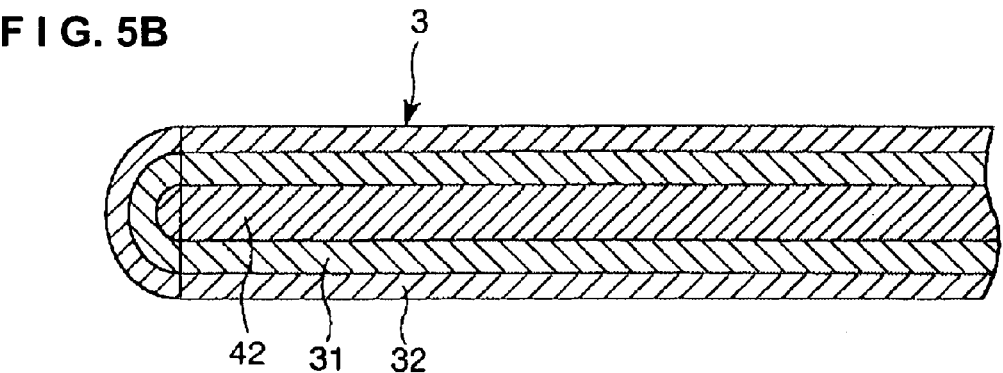

Meanwhile, FIG. 5 is a view showing a modification to the column element of the display device depicted in FIG. 2. In the figure, (a) shows a perspective view of a column element while (b) shows a sectional view of the column element. In the display device 1, the column element in the display region is formed nearly in a quadrangular prism form and the column electrode 42 of the addressing unit 4 is arranged on the surface of the optical waveguide units 3 (see FIGS. 1 and 2). Contrary to this, this modification is characterized in that the column electrode 42 for addressing is buried in the axis of the optical waveguide units 3 (e.g. general-purpose optical fiber). Namely, in this modification, each of the optical waveguide units 3 is formed by a fiber-like member having generally a circular cylinder form and the column electrode 42 of the addressing unit 4 is formed within a core layer 31 of the optical waveguide units 3. This structure advantageously facilitates fabricating column elements. Incidentally, the column electrode 42 is structured of an electrically conductive material of platinum, carbon fiber or the like.

Figure 6A:
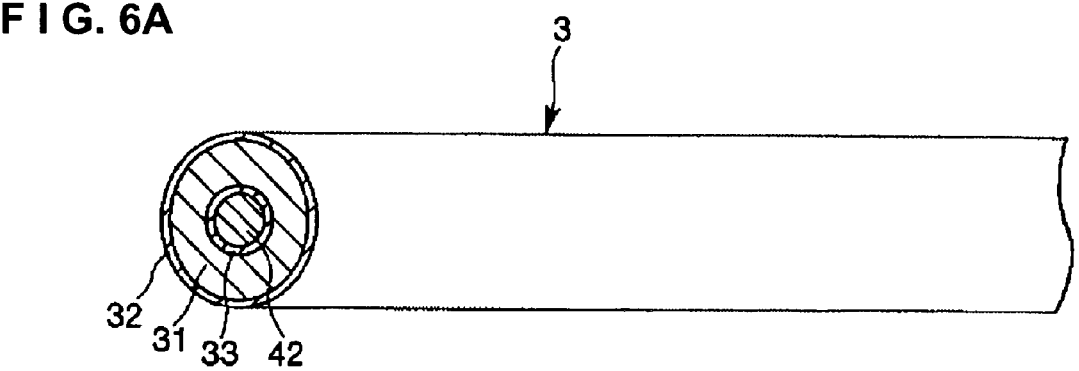
FIGS. 6A and B are views showing a modification to the column element of the display device depicted in FIG. 5.
Figure 6B:
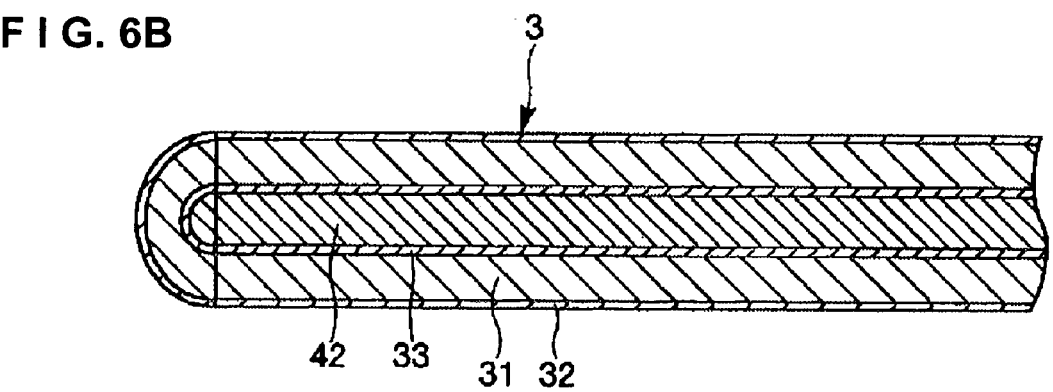

Meanwhile, FIG. 6 is a view showing a modification to the column element of the display device depicted in FIG. 5. In the figure, (a) shows a perspective view of a column element while (b) shows a sectional view of the column element. In this modification, an internal cladding layer 33 is further formed on the peripheral surface of a column electrode 42 (or at an interface of the column electrode 42 and the core layer 31), in the column element of the display device 1 depicted in FIG. 5. In this structure, the light entering the optical waveguide units 3 travels within the optical waveguide units 3 while totally reflecting positively between the cladding layer 32 and the internal cladding layer 33. This can advantageously reduce the loss of light transfer within the optical waveguide units 3 as compared to that of the modification depicted in FIG. 5.

Figure 7:
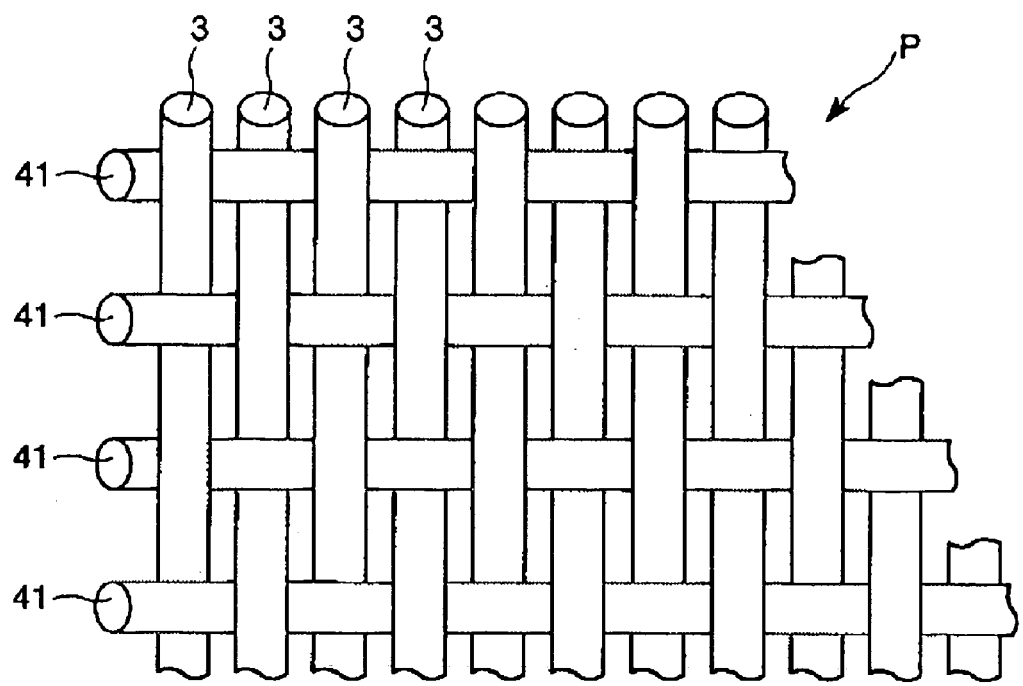
FIG. 7 is a view showing a modification to the display device depicted in FIG. 1.

Meanwhile, FIG. 7 is a view showing a modification to the display device depicted in FIG. 1. In this modification, the column elements 3, 42 are used as warp threads and the row elements 41 as weft threads. By plain-weaving these, a display panel P can be structured. This structure can make use of the existing high-leveled infrastructure in the field of textile art when manufacturing a display panel P, hence advantageously enabling to manufacture a product more easily and at lower cost as compared to the conventional display device. The display panel P can be advantageously made up by a correct, neat arrangement of column elements 3, 42 and row elements 41. Particularly, because the optical waveguide units 3 and the addressing unit 4, forming the display panel P, are both formed of fiber-like members in this display device 1, a display panel P can be easily formed by such plain weaving. This advantageously provides a method for manufacturing a novel display device 1 (display panel P). Meanwhile, in the display device 1, because the display panel P can be manufactured by the similar manufacturing process to the existing texture, a large-area display panel P can be advantageously manufactured without limitation in display region area.

Meanwhile, FIG. 8 is a view showing a modification to the display device depicted in FIG. 7. This modification is characterized in that there is provided a dimensional difference in diameter between the warp thread (column element 3, 42) and the weft thread (row element 41). Namely, where the warp thread and the weft thread are of the same diameter, the optical waveguide units 3 as a warp thread is concealed by the weft thread, thus possibly diminishing the display performance of the display panel P. In this respect, this modification, because the weft thread is formed thinner in diameter than the warp thread, the concealed area of the warp thread is advantageously reduced, hence improving the display performance in the display region.

Figure 9:
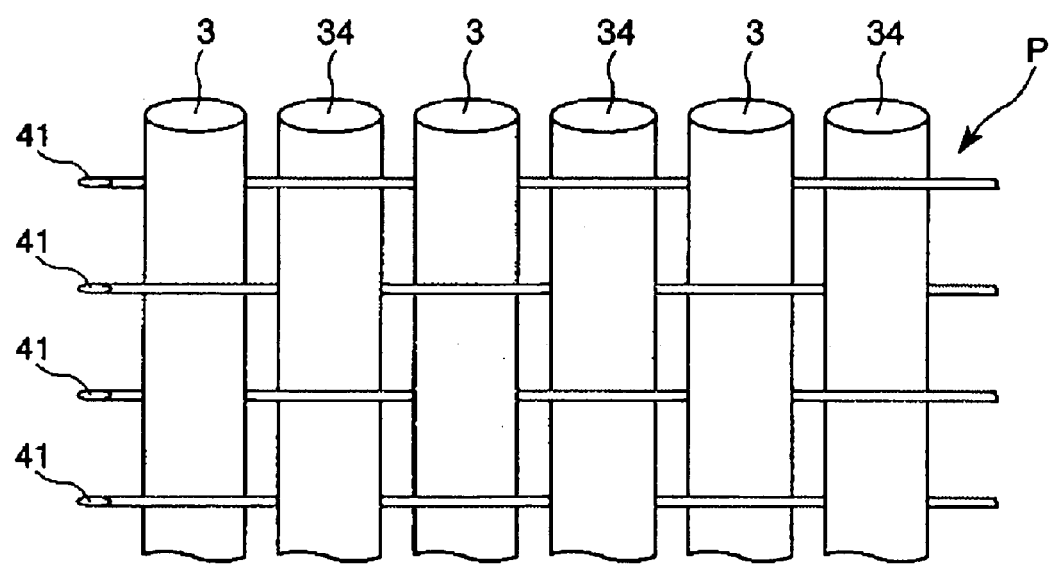
FIG. 9 is a view showing a modification to the display device depicted in FIG. 8.

Meanwhile, FIG. 9 is a view showing a modification to the display device depicted in FIG. 8. In this modification, a dummy fiber 34 is further insertedly weaved between the warp threads (column elements 3, 42). The light from the light-emitting element 21 is not to enter the dummy fiber 34. In this structure, because warp threads are arranged with a predetermined space by the dummy fiber 34, the pixels a–l are arranged with balance on the display panel P. This can advantageously suppress display irregularity (uneven light intensity occurrence) resulting from warp threads concealment by the weft threads (row elements 41).

Figure 10B:
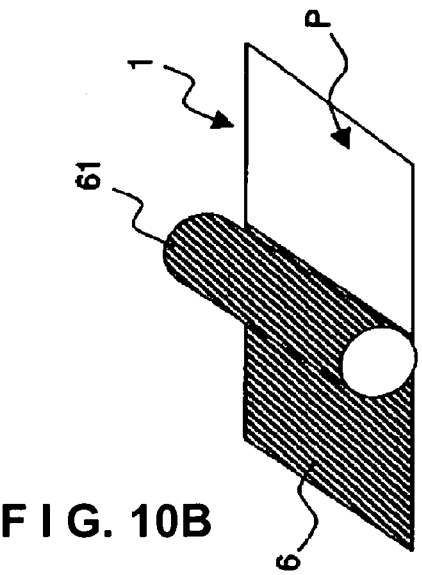
FIGS. 10A–C are views showing a modification to the display device depicted in FIGS. 7 to 9.
Figure 10A:
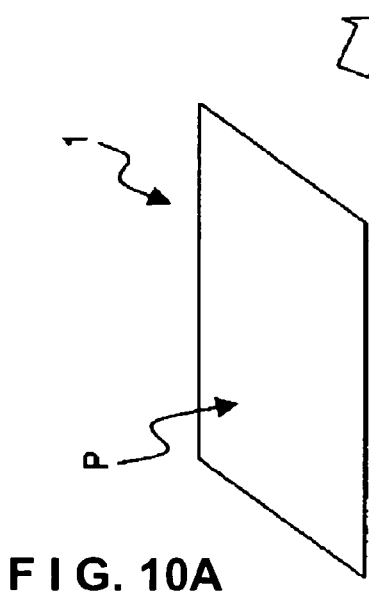
Figure 10C:
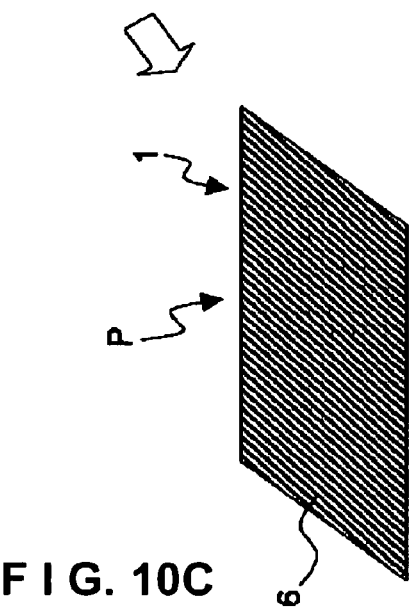

Meanwhile, FIG. 10 is a view showing a modification to the display device depicted in FIGS. 7 to 9. In the modifications of FIGS. 7 to 9, because the display panel P is formed by plain-weaving the warp thread (column element 3, 42) and the weft thread (row element 41), a number of interfaces with air exist in the surface thereof. In such a structure, the external light readily reflects (scatters) at the interface of the light waveguide units 3 or addressing unit 4 of the display panel P. If so, there is a fear for the reflection light and the image signal light (light extracted out of the pixels a–l) to superimpose together and raise the OFF level of the display device 1, resulting in a deteriorated contrast of the display image. In this respect, the present display device 1 is characterized in that a filler material 6, such as a transparent resin material, is filled over the interface of the display panel P. In other words, the display panel P of the display device 1 is covered at its surface with the filler material 6. Because this decreases the interface in the display region and suppresses light scattering, the display device 1 is advantageously improved in its display quality (contrast, brightness uniformity, viewability, etc.).

Incidentally, in the modification depicted in FIG. 10, the filler material 6 is applied to and filled in the display area by a roller 61. Meanwhile, the filler material 6 preferably has a refractive index approximate to that of the cladding layer 32 of the optical waveguide units 3. This advantageously enhances display performance. Meanwhile, the filler material 6 preferably employs a resin material having a certain degree of flexibility after being cured. This advantageously enables rolling up and accommodating the display panel P with flexibility.

Figure 11:
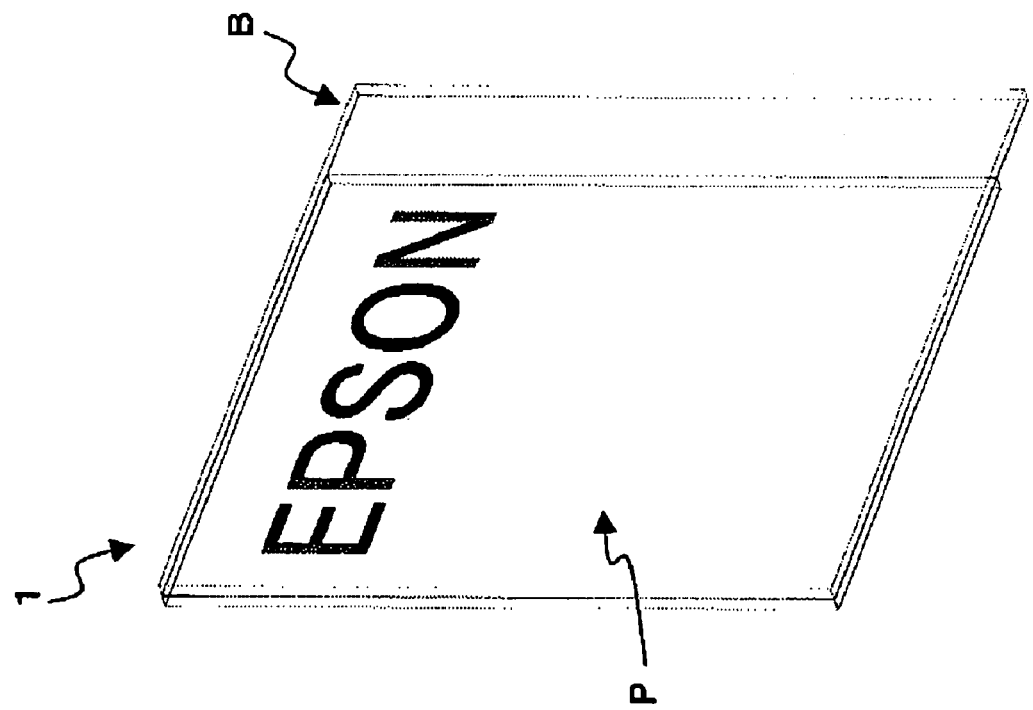
FIG. 11 is a view showing a modification to the display device depicted in FIG. 1.
Figure 12:
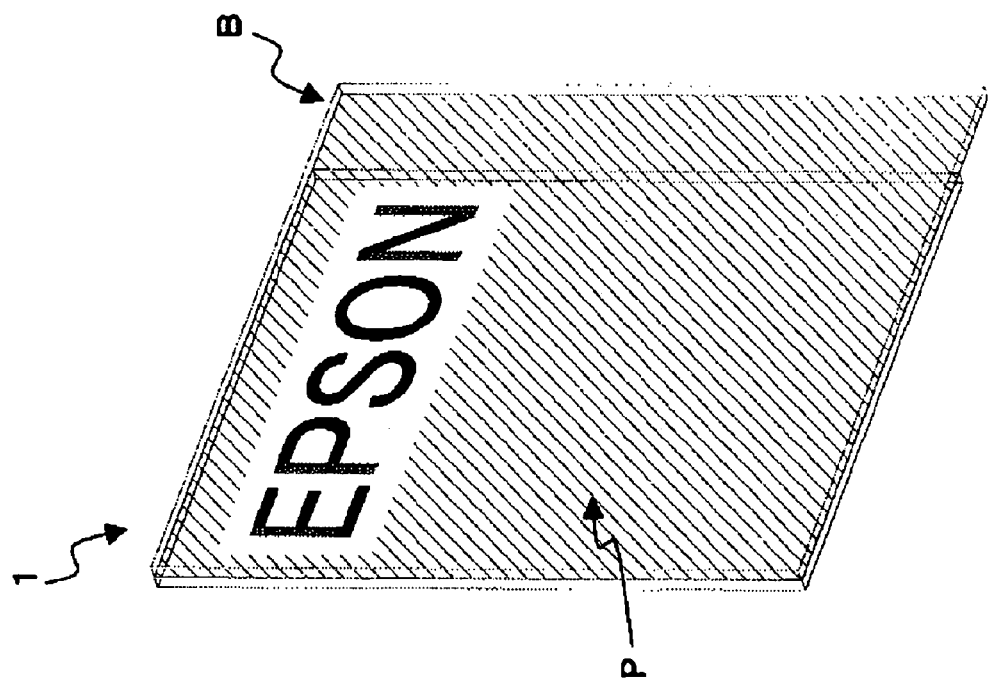
FIG. 12 is a view showing a modification to the display device depicted in FIG. 1.

Meanwhile, FIGS. 11 and 12 are views showing a modification to the display device depicted in FIG. 1. FIGS. 13 and 14, are explanatory views showing the drive control to the back layer depicted in FIGS. 11 and 12. In this modification, the display panel P of the display device 1 has a transparent structure wherein a back layer B is provided on the backside of the display panel P. The back layer B is structured by filling a liquid crystal within a cell generally in a plate form, thus having a structure for switching over between a transparent state and a light absorbing state (black state). The back layer B is arranged on the backside of the display panel P, to make a display on the front display panel P, advantageously enhancing the additional function to the display device 1. Incidentally, in the display panel P having a transparent structure, the constituent elements 3, 4 are made of a transparent material.

Here, the back layer B depicted in FIGS. 11 to 14 employs a TN (twisted nematic) liquid crystal, for example. TN liquid crystal serves as an optical shutter by virtue of its polarization and optical rotary functions (see FIGS. 13 and 14). Specifically, in a state where the back layer B is powered off (see FIGS. 13(*a*) and 14(*a*)), the back layer B assumes a transparent state because light is allowed to pass the back layer B. On the other hand, in a state where the back layer B is powered on (see FIGS. 13(*b*) and 14(*b*)), the back layer B becomes a light-absorbing state because light is not allowed to pass the back layer B. In this manner, in the display device 1, by switching the power on/off, the back layer B can be easily switched in its characteristic.

According to the modifications depicted in FIGS. 11 to 14, by switching over the characteristic of the back layer B, a plurality of functions can be given to the display device 1. Thus, separate applications are advantageously available in accordance with a diversity of use situations by a single display device 1. Meanwhile, in this modification, where the back layer B is in a transparent state, the display device 1 functions as a head-up display. Due to this, because the image on the display device 1 is displayed in a superimposed form over the background, it is advantageously possible to reduce the point-of-view movement and blind spot of the user who is using the display device 1. Meanwhile, in this modification, when the back layer B is in a light-absorbing state, the light externally entering the display panel P is absorbed by the back layer B. Because this reduces the reflection light (light scatter) in the display region, the display quality (contrast, brightness uniformity, viewability, etc.) is advantageously improved in the display device 1. Although this modification exemplified the TN liquid crystal, it is of course possible to use other optical elements that are to act as an optical shutter than TN liquid crystal.

Second Embodiment

Figure 15:
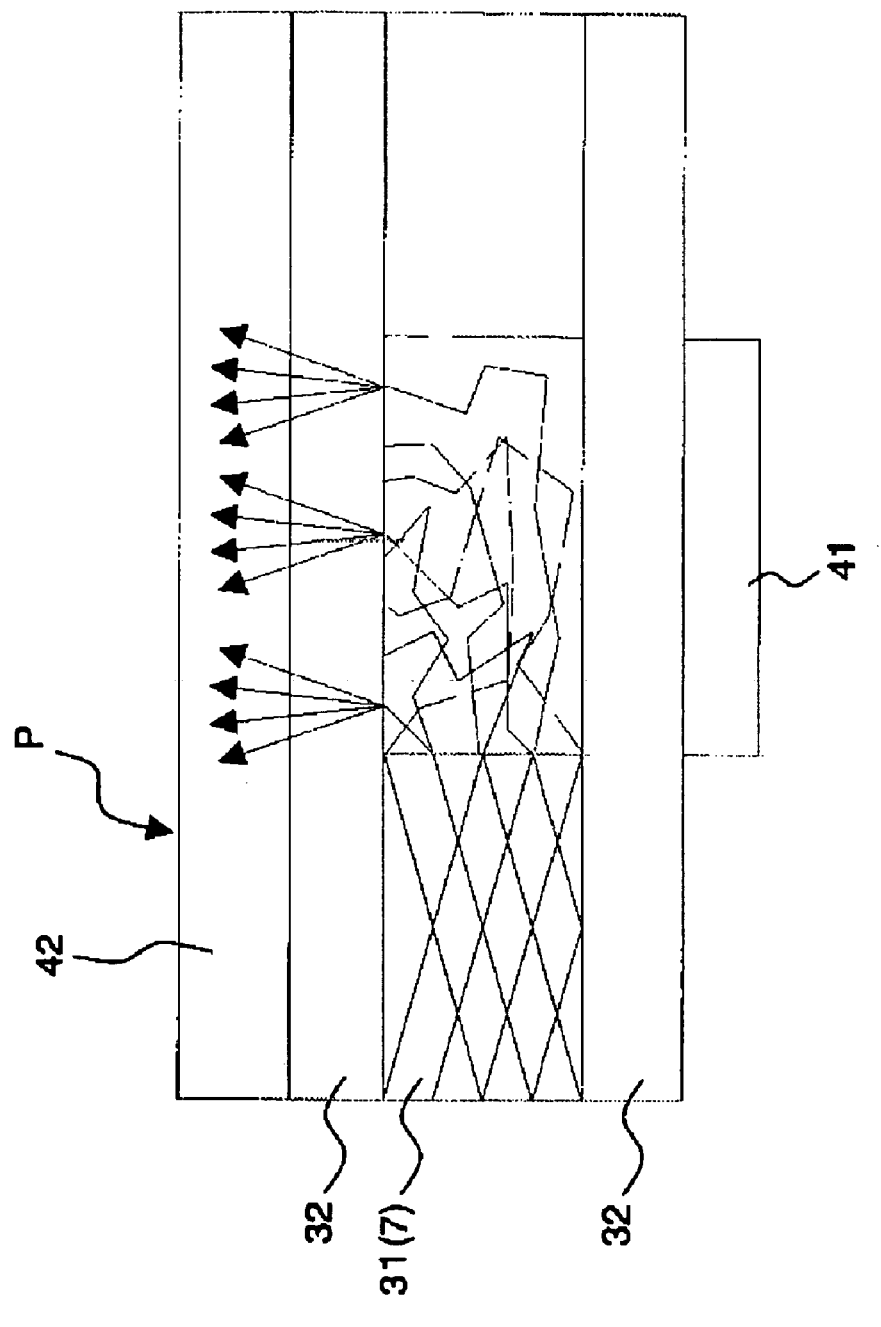
FIG. 15 is an explanatory figure showing the structure and function of a second embodiment of a display device of the present invention.

FIG. 15 is an explanatory view showing the structure and function of a second embodiment of a display device of the invention. In the figure, the same constituent elements to those of the first embodiment are attached with the same references, to omit the explanation thereof The display device 1 is characterized in that each of the optical waveguide units 3 has a core layer 31 structured by a light scattering liquid crystal 7.

Here, light scattering liquid crystal 7 refers to a liquid-crystal material having a characteristic that the light passing the interior thereof is scattered by externally applying an electric field. Such liquid-crystal materials include polymer dispersed liquid crystal (PDLC) and polymer network liquid crystal (PNLC), for example.

Figure 16A:
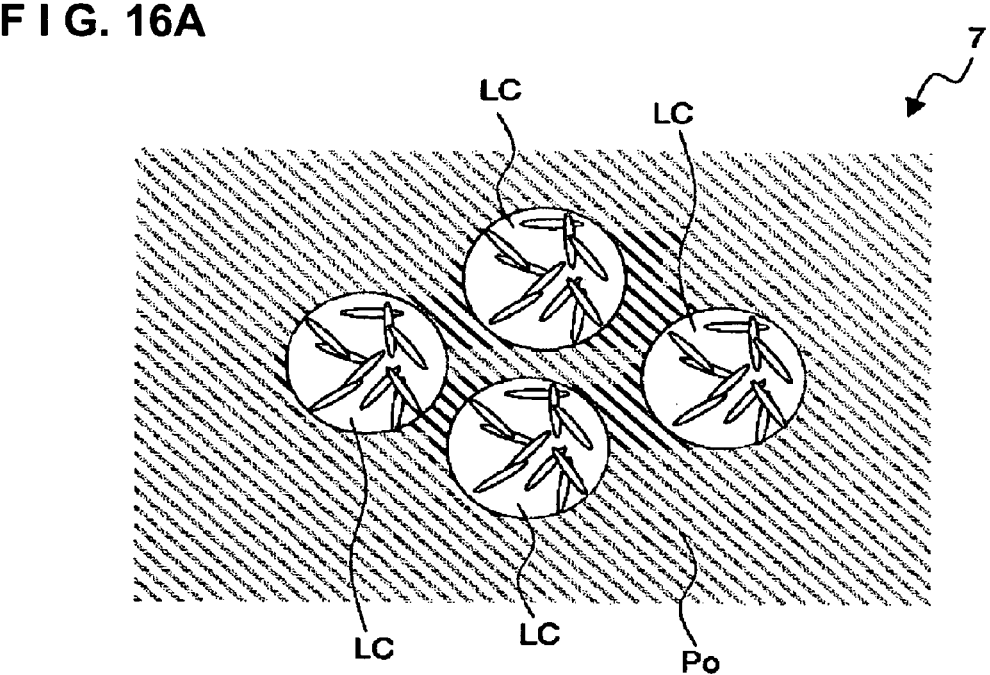
FIGS. 16A and B are explanatory figures showing a characteristic of a light scattering liquid crystal.
Figure 16B:
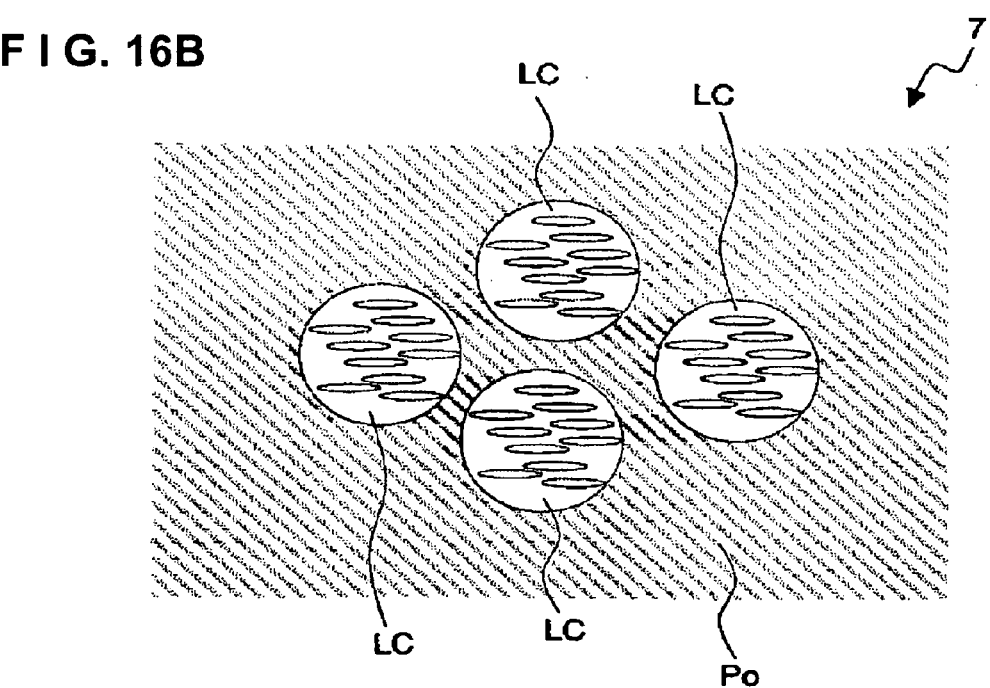
Figure 17A:
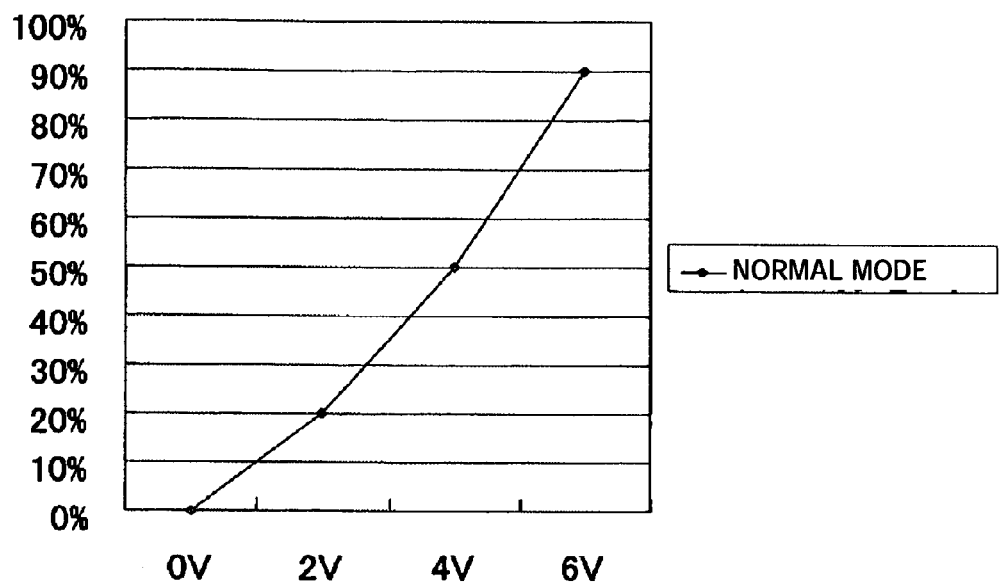
FIGS. 17A and B are explanatory figures showing a characteristic of a light scattering liquid crystal.
Figure 17B:
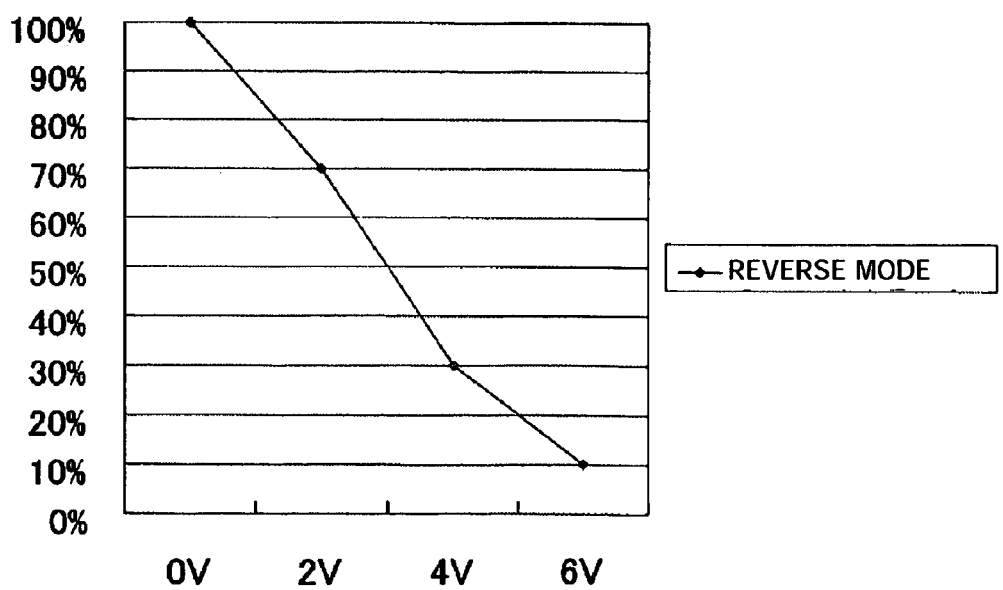

FIGS. 16 and 17 are explanatory figures illustrating the characteristic of a light scattering liquid crystal 7. In this display device 1, explanation is on the case that the light scattering liquid crystal 7 is structured by a polymer dispersed liquid crystal. As shown in these figures, the light scattering liquid crystal 7 has a structure that liquid-crystal molecules LC are dispersed in a mutually separated state in a polymer Po matrix.

The light scattering liquid crystal 7, in an absence of electric-field application, has orientation vectors directed in uneven directions in each drop of dispersed liquid-crystal molecule LC, thus assuming an opaque white state (see FIG. 16(*a*)). In such a state, because the liquid-crystal molecule LC has a refractive index different in between parallel direction and vertical direction relative to the alignment vector, the light refractive index is different between the polymer molecule Po and the liquid-crystal molecule LC. Consequently, due to the difference in the refractive index between the polymer molecule Po and the liquid-crystal molecule LC, light scattering takes place at the interface of those (light scattering action).

Meanwhile, in case an electric field is applied to the light scattering liquid crystal 7, the liquid-crystal molecules LC are aligned in the direction of the electric field thus placing the light scattering liquid crystal 7 in a transparent state (see FIG. 16(*b*)). Thereupon, because the polymer molecule Po and the liquid-crystal molecule LC become nearly equivalent in refractive index, light scattering is weakened at the interface of those, thus allowing light to transmit (light transmission action).

In the display device 1, because the core layer 31 of the optical waveguide units 3 is structured of such a light scattering liquid crystal 7, light scattering takes place within the core layer 31 during selecting the addressing unit 4 (see FIG. 15). Thereupon, the scattering light is emitted out of the optical waveguide units 3, to turn on the pixels a–1 of the display panel P (see FIG. 3). Because the present display device 1 is structured to extract the light out of the optical waveguide units 3 by the action of light scattering, the viewing-angle and brightness characteristics of the display panel P are advantageously improved as compared to the conventional display device 1 for extracting light by changing the refractive index of the optical waveguides.

Incidentally, the display device 1 employs a light scattering liquid crystal 7 that is to exhibit a light transmission action under application of an electric field (normal mode, see FIG. 17(*a*)). This display device 1 does not require an alignment film or a polarizer plate. Furthermore, it is described in respect of easiness to manufacture because of the structure in a normal mode the usual reflective liquid-crystal display adopts. As for driving, complementary voltage application is necessary. The selected region is in a non-application state, and there is a need to prepare an application state in the non-selected region. However, this is not limitative, i.e. the light scattering liquid crystal 7 may employ those that exhibit a light scattering action during electric field application and, conversely, effect a light transmission action during non-application of electric field (reverse mode, see FIG. 17(*b*)). This can simply cause light scattering at a desired point, which is described in respect of the capability of extracting light correctly out of the optical waveguide units 3. Incidentally, the light scattering liquid crystal 7 having such a reverse mode is constituted, for example, by changing the blending ratio of the polymer molecule Po and the liquid-crystal molecule LC. The invention changes the refractive index in a certain region by utilization of optical anisotropy of liquid crystal, to switch over between the states of light scattering and of light transmission, thus being not to limit the scattering display mode scheme of the liquid crystal.

Third Embodiment

Figure 18:
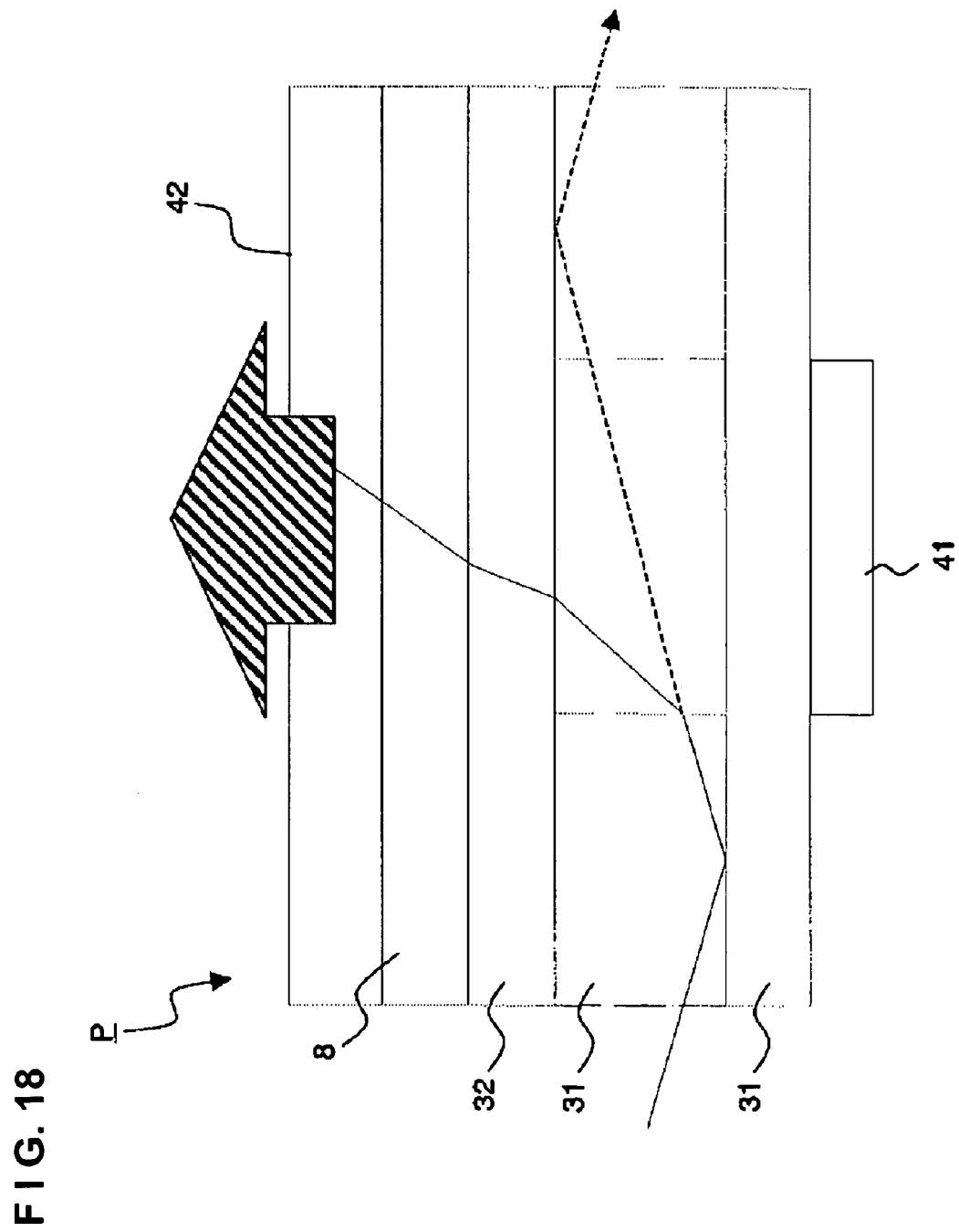
FIG. 18 is a explanatory figure showing the structure and function of a third embodiment of a display device of the present invention.

FIG. 18 is an explanatory figure showing the structure and function of a third embodiment of the invention. In the figure, the same constituent elements to those of the first embodiment are attached with the same references, to omit the explanation thereof The display device 1 is characterized in that a fluorescent layer 8 is provided over the pixels a–l of the display panel P. The light from the light-emitting element 21 acts as excitation light, to provide an energy for obtaining predetermined fluorescent light to the fluorescent layer 8.

The fluorescent layer 8 is formed of a fluorescent material for three colors of red, green and blue, which in any of the colors is arranged on each pixel a–l of the display panel P (see FIGS. 18 and 3). This advantageously makes it possible to make a color display by another technique than the technique of the display device 1. Meanwhile, by arranging the fluorescent layer 8, viewability can be advantageously improved on the display panel P by virtue of its fluorescent action (afterimage action).

Incidentally, the fluorescent layer 8 in this embodiment is provided between the cladding layer 32 and the column electrode 42 (see FIG. 18). In order to shorten the electrode-to-electrode distance to thereby increase electric-field intensity and decrease application voltage, the fluorescent layer 8 may be arranged outboard of the cladding layer 32 and column electrode 42. In such a case as in FIGS. 5 and 6, the fluorescent layer 8 is arranged more outboard than the cladding layer 32. Meanwhile, the colors of the fluorescent layer 8 are not limited to the above three colors. Accordingly, by arranging the fluorescent layer 8 with desired colors, the display image color can advantageously be changed desirably.

Although the display device of the invention was explained so far based on the illustrated embodiments, the invention is not limited to those, i.e. the structure of each element can be replaced with an arbitrary structure having the same function. Other arbitrary constituents may be added to the invention.

Meanwhile, the invention may be a combination of arbitrary two or more structures (features) of the above embodiments.

What is claimed is:

1. A display device comprising:
   a light-emitting unit for emitting light depending upon predetermined display data; and
   a display panel having a plurality of elongated optical waveguide units for conducting light entering from the light-emitting unit, and
   addressing units for extracting light from a predetermined region of within the optical waveguide units depending upon the predetermined display data;
   the addressing units having column electrodes separately provided respectively for the plurality of optical waveguide units and a plurality of elongated row electrodes provided to cross the column electrodes at an opposite side through the optical waveguide units;
   whereby light is caused to emit at the predetermined region by applying a voltage to a crossing point of the column electrodes and the row electrodes.

2. A display device according to claim 1, wherein the column electrodes are provided within the optical waveguide units.

3. A display device according to claim 1, wherein each optical waveguide unit has a core layer for propagating light and a cladding layer covering an outer shell of the core layer,
   each column electrode being provided within the core layer.

4. A display device according to claim 3, wherein an internal cladding layer is formed on a peripheral surface of the column electrode.

5. A display device according to claim 1, wherein each optical waveguide unit has a core layer for propagating light and a cladding layer covering an outer shell of the core layer,
   the core layer being structured of a material having a changeable refractive-index,
   the addressing units being structured to cause light to emit from an interior of the optical waveguide units due to a change in the refractive index of the material having the changeable refractive-index.

6. A display device according to claim 1, wherein each optical waveguide unit has a core layer for propagating light and a cladding layer covering an outer shell of the core layer,
   the core layer being structured of a light scattering liquid crystal,
   the addressing units being structured to cause light to emit from an interior of the optical waveguide units due to a light scattering action of the light scattering liquid crystal.

7. A display device according to claim 1, wherein the addressing units are driven by multiplex driving.

8. A display device according to claim 1, wherein the optical waveguide units and the row electrodes of the addressing units are respectively arranged substantially in straight-lines and structured substantially orthogonal to one another.

9. A display device according to claim 1, wherein the optical waveguide units and the row electrodes of the addressing units are arranged in a textile form.

10. A display device according to claim 9, wherein a surface of the display panel is coated with a transparent material.

11. A display device according to claim 1, wherein a back layer for absorbing light is provided on a backside of the display panel.

12. A display device according to claim 1, wherein a back layer is provided on a backside of the display panel,
   the back layer being structured to selectively take a state to transmit light externally entering the display panel and an absorbing state.

13. A display device according to claim 1, wherein the light-emitting unit is structured to allow red light, green light and blue light to enter the optical waveguide units.

14. A display device according to claim 1, wherein a fluorescent layer having a fluorescent material is provided at least on an area of the display panel where the light is to be taken out.

* * * * *